United States Patent
Ma

(10) Patent No.: US 10,641,786 B2
(45) Date of Patent: May 5, 2020

(54) FLUID TEST DEVICE WITH ELECTRICAL CONNECTOR HAVING ELECTRIC HEATING TUBE FOR HEAT EXCHANGE PROCESS

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 189 days.

(21) Appl. No.: 15/777,083

(22) PCT Filed: Jul. 7, 2017

(86) PCT No.: PCT/CN2017/092162
§ 371 (c)(1),
(2) Date: May 17, 2018

(87) PCT Pub. No.: WO2018/120747
PCT Pub. Date: Jul. 5, 2018

(65) Prior Publication Data
US 2019/0339299 A1   Nov. 7, 2019

(30) Foreign Application Priority Data

Dec. 30, 2016 (CN) .......................... 2016 1 1270743
Jan. 20, 2017 (CN) .......................... 2017 1 0042287

(51) Int. Cl.
G01P 5/165 (2006.01)
G01P 1/00 (2006.01)
H01R 13/66 (2006.01)

(52) U.S. Cl.
CPC .............. G01P 5/165 (2013.01); G01P 1/006 (2013.01); H01R 13/6683 (2013.01)

(58) Field of Classification Search
None
See application file for complete search history.

(56) References Cited

U.S. PATENT DOCUMENTS

2012/0308217 A1   12/2012   Wiedlroither

FOREIGN PATENT DOCUMENTS

| CN | 1696617 A | 11/2005 |
|----|-----------|---------|
| CN | 2901765 Y | 5/2007 |

(Continued)

OTHER PUBLICATIONS

International Search Report dated Oct. 11, 2017; PCT/CN2017/092162.

*Primary Examiner* — Harshad R Patel

(57) ABSTRACT

An electrical connector includes a main body portion, connection portions, a total pressure acquisition portion and a static pressure acquisition portion. The connection portions are configured to allow the main body portion to be electrically connected to a charged element provided in a flow channel. The total pressure acquisition portion includes a total pressure measuring hole provided in a first part, facing a flow direction of fluid, of the main body portion. The static pressure acquisition portion includes a static pressure measuring hole provided in a second part, parallel to the flow direction of the fluid, of the main body portion. The fluid state test device and the fluid heat exchange system having the electrical connector are also provided. Thus, the original flow field where the electrical connector of the electrode of the electric heat source is located may not be changed, which avoids destruction to the flow field.

31 Claims, 11 Drawing Sheets

(56) References Cited

FOREIGN PATENT DOCUMENTS

| | | |
|---|---|---|
| CN | 101886843 A | 11/2010 |
| CN | 102959340 A | 3/2013 |
| CN | 103148978 A | 6/2013 |
| CN | 103226051 A | 7/2013 |
| CN | 205691278 U | 11/2016 |
| JP | 2005-164270 A | 6/2005 |

FLUID TEST DEVICE WITH ELECTRICAL CONNECTOR HAVING ELECTRIC HEATING TUBE FOR HEAT EXCHANGE PROCESS

CROSS-REFERENCE TO RELATED APPLICATIONS

The present application is the national phase of International Application No. PCT/CN2017/092162, titled "ELECTRICAL CONNECTOR, FLUID STATE TEST DEVICE AND FLUID HEAT EXCHANGE SYSTEM", filed on Jul. 7, 2017, which claims priorities to Chinese patent applications No. 201710042287.8 titled "ELECTRICAL CONNECTOR, FLUID STATE TEST DEVICE AND FLUID HEAT EXCHANGE SYSTEM", filed with the Chinese State Intellectual Property Office on Jan. 20, 2017, and No. 201611270743.6 titled "ELECTRICAL CONNECTOR, FLUID STATE TEST DEVICE AND FLUID HEAT EXCHANGE SYSTEM", filed with the Chinese State Intellectual Property Office on Dec. 30, 2016, the entire disclosures of which applications are incorporated herein by reference.

FIELD

This application relates to the technical field of electrical engineering, and particularly to an electrical connector, a fluid state test device and a fluid heat exchange system.

BACKGROUND

An electric heating tube (or called a metal tubular electric heating element) is a charged element configured to convert electrical energy into thermal energy. Compared with conventional heating, the electric heating tube is pollution-free, convenient to install and use, cheap, and belongs to environmentally friendly green production, thus the electric heating tube is widely used. The electric heating tube may be applied in multiple types of devices which require heat exchange process. For example, multiple electric heating tubes may be combined into a heat exchange system to be installed in a fluid channel of a saltpeter tank, a water tank, an oil tank, an acid-alkali tank, a fusible metal melting furnace, an air heating furnace, a drying furnace, a drying oven, a hot die and other devices.

In the case that multiple electric heating tubes are installed in an annular fluid heat exchange transmission channel (a fluid channel) in a circular ring-shaped heating device, the multiple electric heating tubes are respectively connected to fixed ends of the electric heating tubes in the fluid channel to be fixed. Phases of the electrodes of the multiple electric heating tubes are required to be connected in series or in parallel to form a multiphase-load heat generation resource, and the multiple electric heating tubes are supplied with power via alternating current. Therefore, the electrodes of the electric heating tubes are required to be connected in a split-phase manner, connected in series or connected in parallel by means of the electrical connector, and further are connected with an external power supply. In this case, the electrical connector itself, in addition to transmitting the electric energy, is located in the channel where the fluid flows and becomes an obstacle in a flow path of the fluid-hot air, which may cause forced vibration of the electrical connector and even induce coupled vibration (i.e., resonance) of the electrical connector and the fluid, thereby causing the electrical connector to be prone to be disengaged and separated from the electrodes of the electric heating tube and thus causing a short-circuit fault.

In the conventional technology, in a method for addressing the above issue, the electrical connector is prevented from vibrating, that is, the electrical connectors (such as wires) connected to extraction electrodes of a number of branch electric heating tubes are configured to pass through and be extracted from the fluid channel directly in a radial direction of the fluid channel, and the extracted electrodes are connected in series or connected in parallel outside the fluid channel, which may cause many joints and make connection and fixing processes of external leads of a device complex. Moreover, in the case that the fluid in the fluid channel is liquid, a strict sealing process for preventing the fluid channel from leaking is further required. In another method for addressing the above issue, in the case that the fluid in the fluid channel is liquid, the electrical connector is not allowed to be extracted to the outside, and in this case, multiple electrical connectors must be connected in series or in parallel inside the fluid channel. In the case that insulation flexible leads are selected as the electrical connector for connecting the electrodes of the electric heating tubes, in order to prevent the leads from resonating in the fluid under the action of fluid pressure, the insulation leads are required to be fixed to an inner wall of the fluid channel, and after failure of insulation between insulation layers of the leads and the metal inner wall of the fluid channel, discharge of the electrical connector may be caused, resulting in a short-circuit fault of the entire heat exchange system.

Therefore, there is an urgent demand for a new electrical connector, a fluid state test device and a fluid heat exchange system.

SUMMARY

An object of the present application is to provide an electrical connector, a fluid state test device and a fluid heat exchange system, which may measure and monitor a flow speed of a fluid without affecting a fluid flow field where the electrical connector, the fluid state test device and the fluid heat exchange system are located.

Another object of the present application is to provide an electrical connector, a fluid state test device and a fluid heat exchange system, which may measure and monitor a fluid pressure without affecting a fluid flow field where the electrical connector, the fluid state test device and the fluid heat exchange system are located.

Another object of the present application is to provide an electrical connector, a fluid state test device and a fluid heat exchange system, which may measure and monitor a fluid resistance without affecting a fluid flow field where the electrical connector, the fluid state test device and the fluid heat exchange system are located.

Another object of the present application is to provide an electrical connector, a fluid state test device and a fluid heat exchange system, which may measure and monitor the frequency of a lateral vibration of the electrical connector without affecting a fluid flow field where the electrical connector, the fluid state test device and the fluid heat exchange system are located.

Another object of the present application is to provide an electrical connector, a fluid state test device and a fluid heat exchange system, which may suppress a longitudinal vibration and/or lateral vibration of the electrical connector itself without affecting a fluid flow field where the electrical connector, the fluid state test device and the fluid heat exchange system are located.

According to one aspect of the present application, an electrical connector configured to measure a state of fluid in a flow channel is provided. The electrical connector includes a main body portion, connection portions, a total pressure acquisition portion and a static pressure acquisition portion. The connection portions allow the main body portion to be electrically connected to a charged element provided in the flow channel. The total pressure acquisition portion includes a total pressure measuring hole in a first part, facing a flow direction of the fluid, of the main body portion. The static pressure acquisition portion includes a static pressure measuring hole provided in a second part, parallel to the flow direction of the fluid, of the main body portion.

According to another aspect of the present application, a fluid state test device is provided, which includes an electrical connector and a first pressure measurement portion. The electrical connector includes a main body portion, connection portions, a total pressure acquisition portion and a static pressure acquisition portion. The connection portion allows the main body portion to be electrically connected to a charged element provided in a flow channel. The total pressure acquisition portion includes a total pressure measuring hole provided in a first part, facing a flow direction of fluid, of the main body portion. The static pressure acquisition portion includes a static pressure measuring hole provided in a second part, parallel to the flow direction of the fluid, of the main body portion. The first pressure measurement portion is connected to the total pressure measuring hole and the static pressure measuring hole respectively to measure a pressure state of the fluid.

According to another aspect of the present application, a fluid heat exchange system is provided, and the fluid heat exchange system includes a flow channel through which fluid flows, a charged element fixed to the flow channel, and the fluid state test device described hereinabove. The charged element is an electric heating element, and the electric heating element includes a heating body and an electrode located at an end of the heating body. The electrical connector is connected to the electrode of the electric heating element.

According to the present application, the structure of the electrical connector which connects the electrodes of the electric heat source in a split-phase manner, in series or in parallel is developed and the function is also extended, breaking through the function in the conventional sense that a conductor can only perform the task of transmitting electric energy, and allowing the electric connector further to have sensing, testing and other functions, which makes a major breakthrough in the conventional technology. According to the present application, the original flow field in a fluid system where the electrical connector of the electrode of the electric heat source is located may not be changed, and the sensor and the test system are not introduced around the electrical connector of the electrode of the electric heat source, which avoids the destruction to the flow field around the electrical connector of the electrode of the electric heat source. And at least one of the following information may be obtained through the present application: (1) information about forced vibration of the electrical connector of the electrode of the electric heat source; (2) information about the velocity of the fluid in the flow field where the electrical connector of the electrode of the electric heat source is located; (3) information about the condition of convective heat exchange between the electrical connector of the electrode of the electric heat source and the fluid.

Figure 1:
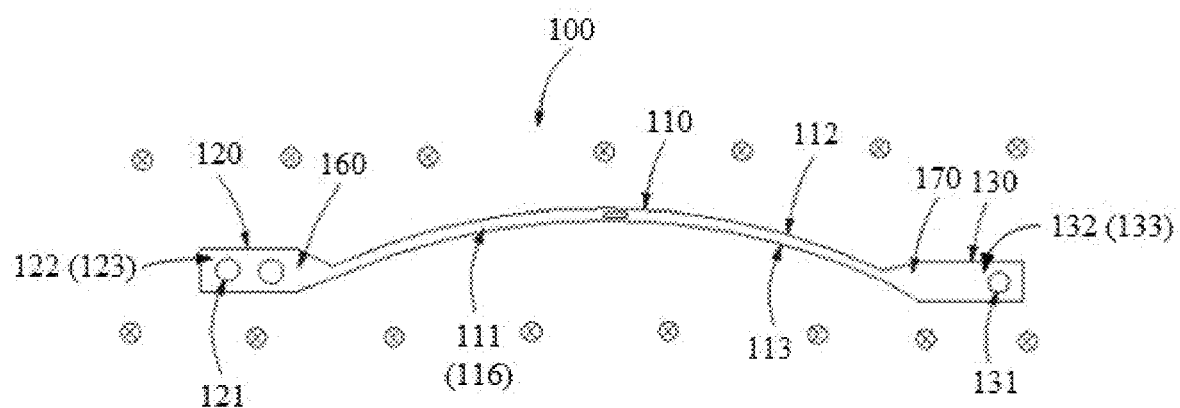
FIG. 1 is a front view of an electrical connector in a state of being installed in a fluid channel according to the present application.

| Reference Numerals: | |
|---|---|
| 100. electrical connector, | 110. main body portion, |
| 111. upstream side, | 112. first side, |
| 113. second side, | 120. first connection portion, |
| 114. first temperature sensing element mounting recess, | 122. connection surface, |
| | 130. second connection portion, |
| 115. second temperature sensing element mounting recess, | 141. total pressure measuring hole, |
| 116. downstream side, | |
| 121. connection hole, | 143. total pressure output port, |
| 123. connection surface, | 151. static pressure measuring |

-continued

Reference Numerals:

| | |
|---|---|
| 140. total pressure acquisition portion, | hole, |
| 142. total pressure transmission channel, | 153. static pressure output port, |
| 150. static pressure acquisition portion, | 170. twist portion, |
| 152. static pressure transmission channel, | 181. first temperature sensing element, |
| 160. twist portion, | |
| 180. first pressure measurement portion, | 190. frequency calculation unit, |
| 182. second temperature sensing element, | 192. second bridge resistor, |
| 191. first bridge resistor, | 194. power supply, |
| 193. constant current source, | 196. filter, |
| 195. amplifier, | 198. converter, |
| 197. flip-flop, | 201. metal outer tube, |
| 200. electric heating tube, | 203. filler, |
| 202. resistance wire, | 205. insulation ceramic head, |
| 204. electrode, | 210. back pressure acquisition portion, |
| 206. helical fin, | |
| 211. back pressure measuring hole, | 212. back pressure transmission channel, |
| 213. back pressure output port, | |
| 230. second pressure measurement portion, | 220. helical wire, |
| | 240. resistance coefficient calculation unit, |
| 241. multiplier, | |
| 243. divider, | 242. multiplier, |
| 301. fixed end, | 300. fluid channel, |
| 410. main body portion, | 400. electrical connector, |
| 430. second connection portion. | 420. first connection portion, |

DETAILED DESCRIPTION OF EMBODIMENTS

Hereinafter, embodiments of the present application are described with reference to the drawings. The following detailed description of the drawings is used to illustrate principles of the present application by way of example, and the present application is not limited to preferred embodiments described. The scope of the present application is defined by the claims.

FIGS. 1 to 10 show an electrical connector 100 according to the present application. The electrical connector 100 is configured to connect charged elements provided in a fluid channel to electrically connect the charged element and a power supply or electrically connect the charged elements with each other. The charged element may be an electric heating element capable of generating heat, or may be another type of charged element capable of achieving electricity conducting function. In an embodiment shown in FIG. 1, fluid flows inward in a direction perpendicular to the paper, and a flow direction of the fluid is indicated by a circle within which an arrow tail is located. Hereinafter, the structure of the electrical connector 100 is described by taking the flow direction of the fluid as a reference.

FIG. 1 is a front view of the electrical connector 100 in a state of being installed in the fluid channel. The electrical connector 100 includes a main body portion 110, and a first connection portion 120 and a second connection portion 130 which are respectively located at two ends in a length direction of the main body portion 100. The main body portion 110 includes an upstream side ill, a first side 112, a second side 113 and a downstream side 116 (see FIG. 2). The upstream side 111 is a surface, facing the flow direction of the fluid, of the main body portion 110, and the upstream side 111 is impacted directly by the fluid in the fluid channel and generates a resistance which impedes the fluid flow. The downstream side 116 is a surface away from the flow direction of the fluid of the main body portion 110, and the downstream side 116 is opposite to the upstream side 110 and is not impacted by the fluid in the fluid channel. The first side 112 and the second side 113 are usually parallel to the flow direction of the fluid. The first connection portion 120 and the second connection portion 130 are respectively located at two ends of the main body portion 110. The first connection portion 120 has a connection hole 121, and a connection surface 122 and a connection surface 123 facing to each other. The second connection portion 130 has a connection hole 131, and a connection surface 132 and a connection surface 133 facing to each other. The connection holes 121,131 may allow electrodes of two charged elements (see FIG. 16) to pass through. A portion, passing through the connection hole, of the electrode is provided with threads, and the electrodes may be fixed to the respective first connection portion 120 and the respective second connection portion 130 by a fastener such as a nut, thus an electrical connection between two charged elements respectively connected at two ends of the electrical connector 100 is achieved. Preferably, the connection surfaces 122,123 and/or the connection surfaces 132,133 are flat surfaces, thus facilitating pressing and fixing the electrode of the charged element after passing through the connection holes by the fastener.

For the first side 112 and the second side 113, in order to allow a flow state of the fluid passing through the first side 112 and a flow state of the fluid passing through the second side 113 to be in substantially the same condition, preferably, the first side 112 is parallel to the second side 113. In the embodiment shown in FIG. 1, the main body portion 110 is arc-shaped, that is, both the first side 112 and the second side 113 are curved surfaces. In other embodiments, as shown in FIG. 2 and FIG. 3, both first side 112 and the second side 113 are flat surfaces.

Figure 2:
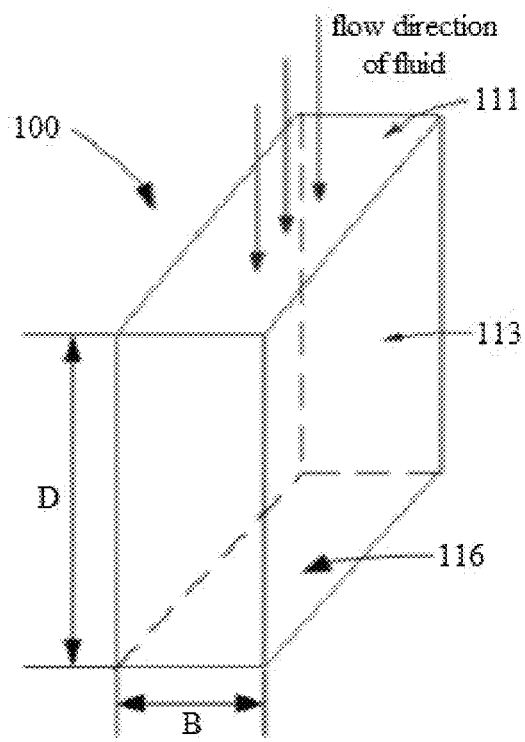
FIG. 2 is a partially schematic view of an electrical connector according to an embodiment of the present application.
Figure 3:
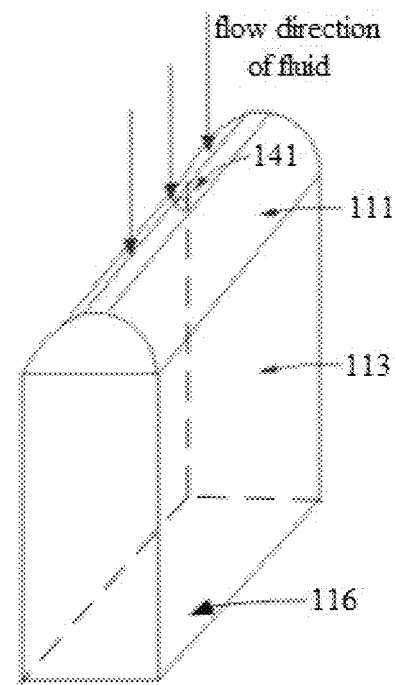
FIG. 3 is a partially schematic view of an electrical connector according to another embodiment of the present application.

For the upstream side 111, in order to accurately acquire and measure a fluid pressure applied on the upstream side 111, in an embodiment shown in FIG. 2, the upstream side 111 is a flat surface. Preferably, the upstream side 111 is a surface perpendicular to the flow direction of the fluid. In another embodiment shown in FIG. 3, the upstream side 111 is a curved surface for reducing the resistance to the fluid. Furthermore, a region, where a total pressure measuring hole 141 is provided, of the upstream side 111 is a flat surface.

In order to reduce the resistance of the upstream side 111 to the fluid and also reduce the pressure applied by the fluid on the upstream side 111 in the flow direction of the fluid, a size of the upstream side 111 in a direction perpendicular to the flow direction of the fluid, that is a size of the upstream side 111 in a thickness direction, should be reduced as much as possible. In the embodiment shown in FIG. 1, the size of the upstream side 111 in the thickness direction is less than a size of the main body portion 110 in a direction parallel to the flow direction of the fluid, that is, a size of the main body portion 110 in a width direction. That is, the size of the upstream side 111 in the thickness direction is less than a size of the side (that is, the first side 112 and the second side 113) of the main body portion 110 in the width direction. In this way, the upstream side 111 has a small upwind area and thus a low resistance is generated, and the upstream side 111 is not apt to bend, and accordingly a small low longitudinal vibration (vibration in the flow direction of the fluid) is generated.

Further, for the electrical connector 100, with a rectangular cross-section of the upstream side 111, that is, a projection section of the upstream side 111 on a plane perpendicular to the flow direction of the fluid being rectangular, the resistance of the electrical connector 100 to the fluid in the fluid channel may be reduced by optimizing a characteristic dimension of the electrical connector 100 with a rectangular cross-section, thus the longitudinal vibration of the electrical connector 100 may be reduced. As shown in FIG. 2, a width D of the electrical connector 100 is a size of the electrical connector 100 in the direction parallel to the flow direction of the fluid, and a thickness B is a size of the electrical connector 100 in the direction perpendicular to the flow direction of the fluid. Therefore, a ratio of width to thickness of the electrical connector 100 is defined as D/B. The pressure of the upstream side 111 of the electrical connector 100 is $p_w$, and the pressure of the downstream side 116 of the electrical connector 100 is $p_l$, and thus the resistance of the upstream side 111 of the electrical connector 100 to the fluid is $F=(p_w-p_l)A$.

In the above equation, A indicates a projection area of the upstream side 111 of the electrical connector 100, that is, an area, directly facing the flow direction of the fluid, of the upstream side 111 of the electrical connector 100.

Both sides of the above resistance equation are divided by 0.5 $\rho_a U^2 A$, and it may be obtained that $C_d=C_{p,w}-C_{p,l}$.

where $\rho_a$ indicates the density of the fluid in the fluid channel, U indicates a speed of the fluid in the fluid channel, $C_{p,w}$ indicates a pressure coefficient of the upstream side 111, $C_{p,l}$ indicates a pressure coefficient of the downstream side 116, and $C_d$ indicates a coefficient of pressure generated by the electrical connector 100 to the fluid that is, a resistance coefficient.

Figure 4:
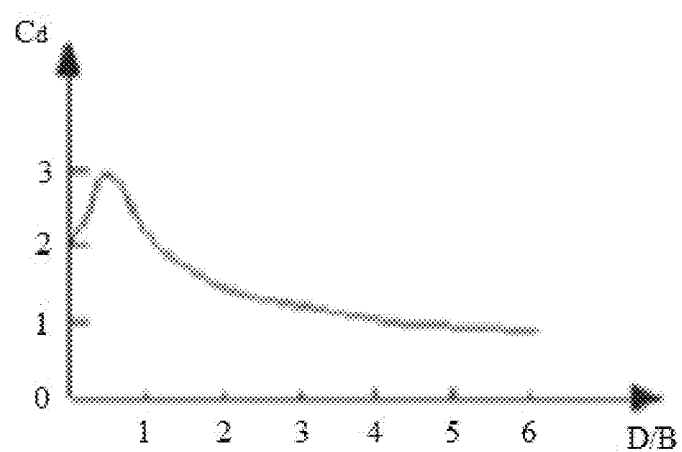
FIG. 4 is a schematic view showing the relationship between a ratio of width to thickness and a resistance coefficient of an electrical connector according to the present application.

In fact, the pressure $p_w$ and the pressure coefficient $C_{p,w}$ of the upstream side 100 may vary with the position of a flat surface or a curved surface of the upstream side 100, while a downstream side pressure (or called a base pressure) is almost constant for the reason that a region where the downstream side is located is completely in a wake zone where the speed of the air flow is relatively low. FIG. 4 shows a curve illustrating a relationship between the resistance coefficient Cd and the ratio of width to thickness D/B. It may be seen from the curve that, in the case that the ratio of width to thickness D/B is about 0.5, ie., the width D is half the thickness B, the resistance coefficient Cd is maximum, that is, the resistance of the electrical connector 100 to the fluid in the fluid channel is maximum and a longitudinal impact force acting on the electrical connector 100 is maximum, thereby the induced longitudinal vibration of the electrical connector 100 is strongest. And it may be seen from the curve that in the case that the ratio of width to thickness D/B is greater than 0.5, the resistance coefficient Cd gradually decreases, and in the case that the ratio of width to thickness D/B is greater than 4, the resistance coefficient Cd tends to be constant, and as the ratio of width to thickness D/B increases, the resistance coefficient Cd reaches a minimum, that is, the resistance of the electrical connector 100 to the fluid in the fluid channel is minimum and the longitudinal impact force acting on the electrical connector 100 is minimum, thereby the induced longitudinal vibration of the electrical connector 100 is weakest.

In the fluid channel, the charged element is usually arranged in a direction parallel to the flow direction of the fluid, and an electrode extending from an end of the charged element is also usually parallel to the flow direction of the fluid. In order to provide a connection hole in each of the first connection portion 120 and the second connection portion 130 and to improve the stability of connection between the electrode and the electrical connector 100, it is required to increase the areas of the connection surfaces 122, 123 of the first connection portion 120 and the areas of the connection surfaces 132, 133 of the second connection portion 130. In this embodiment, sizes in the direction perpendicular to the flow direction of the fluid, of the connection surfaces 122, 123 of the first connection portion 120 and of the connection surfaces 132, 133 of the second connection portion 130 are all greater than a size of the main body portion 110 in the direction perpendicular to the flow direction of the fluid (that is, a size of the upstream side 111).

Figure 5:
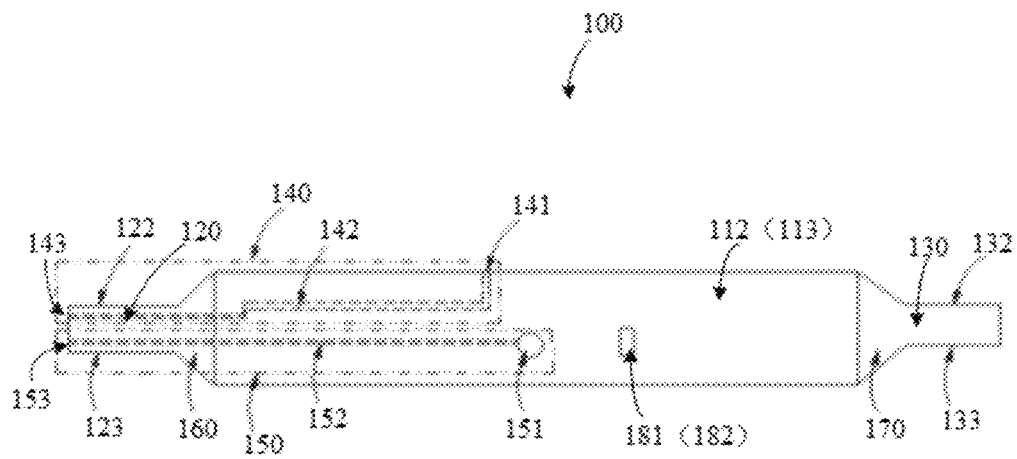
FIG. 5 is a top view of an electrical connector according to an embodiment of the present application.
Figure 6:
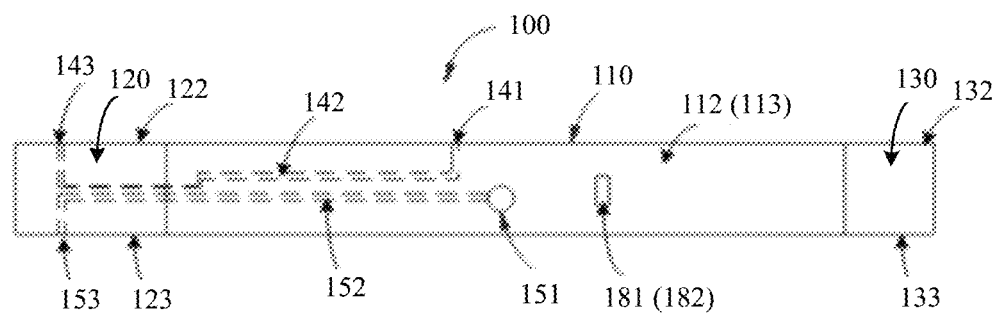
FIG. 6 is a top view of an electrical connector according to another embodiment of the present application.

In the embodiment shown in FIG. 1 or FIG. 5, the electrical connector 100 is formed by a substantially rectangular plate-like component, and the plate-like component is made of a metallic material such as copper or aluminum having a good electrical conductivity. In order to ensure a larger contact surface between each of the first connection portion 120, the second connection portion 130 of the electrical connector 100 and an electrode 204 to facilitate mounting, a twist portion 160 and a twist portion 170 each having a twist angle of 90 degrees, are provided between the main body portion 110 and the first connection portion 120 and between the main body portion 110 and the second connection portion 130, respectively. According to mounting conditions such as positions and orientations of the electrodes of the charged element to be connected, the twist portions 160,170 may also have other twist angles. Further, in other embodiments, the first connection portion 120 and the second connection portion 130 may also be formed by other methods such as a molding process. FIG. 6 is a top view of the electrical connector 100 according to another embodiment of the present application. As shown in the figure, alternatively, the twist portions 160,170 may not be provided between the first connection portion 120 and the main body portion 110 and/or the second connection portion 130 and the main body portion 110, that is, the twist angle is zero. Further, the first connection portion 120 and the second connection portion 130 may be integrally formed with the main body portion 110, or the first connection portion 120 and the second connection portion 130 may be separately formed with respect to the main body portion 110.

Figure 7:
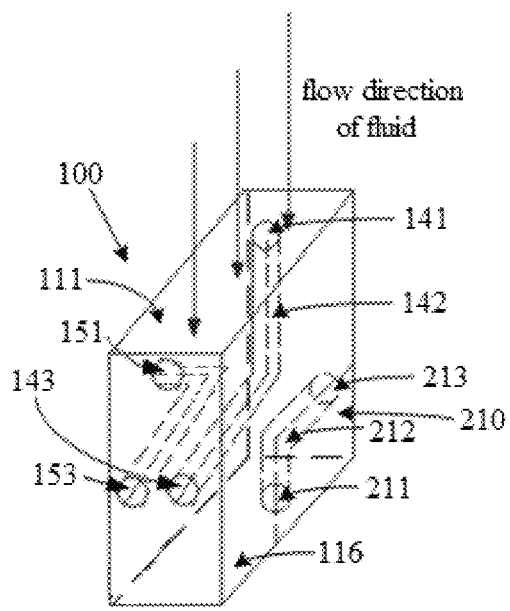
FIG. 7 is a partially schematic view of an electrical connector according to another embodiment of the present application.

In addition to transmitting electric energy, the electrical connector 100 may also be configured to acquire and measure state parameters, such as pressure, temperature, velocity and quantity of flow, of the fluid which flows through the electrical connector 100 in the fluid channel. As shown in FIGS. 5 to 7, the electrical connector 100 is configured to acquire pressures, including a total pressure, a static pressure, a dynamic pressure and a back pressure, at some point in the fluid by a total pressure acquisition portion 140, a static pressure acquisition portion 150 and a back pressure acquisition portion 210 respectively, and the total pressure acquisition portion 140, parameters, such as flow speed, flow rate and resistance coefficient, of the fluid are calculated based on the above pressures. In the conventional technology, a pressure detector or a sampling device is independently provided in the fluid channel to acquire a pressure indication value at a signal source, and such interventional detection may affect a measurement value to a certain extent and cannot reveal the condition of an original state of a fluid field in the fluid channel. The electrical connector 100 according to the embodiment of the present application has both an acquisition function and a measurement function, and an independent detector does not be introduced to the fluid channel, so that the state parameters of the fluid can be measured more accurately.

FIG. 5 and FIG. 6 show the total pressure acquisition portion 140 provided on the electrical connector 100. The total pressure acquisition portion 140 includes a total pressure measuring hole 141 provided in the upstream side 111, a total pressure output port 143 provided in the first connection portion 120, and a total pressure transmission channel 142 provided in the main body portion 110 to allow the total pressure measuring hole 141 to be in communication with the total pressure output port 143. The total pressure measuring hole 141 is provided in the upstream side 111, and the upstream side 111 faces the direction of the upwind inflow in the fluid channel, and the total pressure measuring hole 141 has an opening directly facing the direction of the inflow for measuring a total pressure (or a stagnation pressure) generated by the fluid on the upstream side 111. The total pressure measuring hole 141 is a smooth hole without sharp edges, and may have a circular shape, an oval shape, a polygonal shape and the like. When the fluid is in a motion state, the upstream side 111 facing the flow direction of the fluid is not only subjected to a static pressure from the fluid, but also subjected to a dynamic pressure from the fluid, and the static pressure and the dynamic pressure together form a total pressure acting on the upstream side 111. Since the dynamic pressure has directivity, that is, the dynamic pressure takes effect in the flow direction of the fluid, preferably an axial direction of the total pressure measuring hole 141 is arranged in the flow direction of the fluid, so that the total pressure measuring hole 141 is collinear with the flow direction of the fluid and an included angle between the axial direction of the total pressure measuring hole 141 and the flow direction of the fluid is zero. The total pressure measuring hole 141 may be arranged at any positions on the upstream side 111. Preferably, the total pressure measuring hole 141 is arranged at a substantially central position of the upstream side 111, for measuring a maximum flow speed of the fluid which is going to flow into the total pressure measuring hole 141, that is, the fluid located upstream of the position of the total pressure measuring hole 141. The total pressure transmission channel 142 is provided in the main body portion 110, and the total pressure transmission channel 142 has an entrance in communication with the total pressure measuring hole 141 and an exit extending to the first connection portion 120 of the electrical connector 100, for transmitting the total pressure to the total pressure output port 143. The total pressure transmission channel 142 may be directly formed in the main body portion 110. Or, the total pressure transmission channel 142 is an independent pipeline, and is embedded in a preformed slot in the electrical connector 100 in such a manner that a top surface of the total pressure transmission channel 142 does not go beyond a surface of the upstream side 111, and preferably, the top surface of the total pressure transmission channel 142 is flush with the surface of the upstream side 111. Furthermore, the top surface of the total pressure transmission channel 142 has the same surface structure as the surface of the upstream side 111, for example, an anti-corrosive layer is coated on the entire upstream side including the top surface of the total pressure transmission channel 142. Alternatively, the total pressure transmission channel 142 is an independent pipeline passing through a preformed channel provided in the electrical connector 100. The total pressure output port 143 may be provided in a surface of the main body portion 110 or a surface of each of the connection portions 120, 130. In order to avoid affecting the flow field, the total pressure output port 143 is provided in the first connection portion 120 or the second connection portion 130 and is in communication with the exit of the total pressure transmission channel 142. As shown in FIG. 5, the total pressure output port 143 is provided in an end surface of the first connection portion 120. Alternatively, the total pressure output port 143 may also be provided in an end surface of the second connection portion 130. Alternatively, the total pressure output port 143 may be provided in the connection surface 122 or the connection surface 123 of the first connection portion 120 or in the connection surface 132 or the connection surface 133 of the second connection portion 130. As shown in FIG. 6, the total pressure output port 143 may be provided in the connection surface 122 of the first connection portion 120.

FIG. 5 and FIG. 6 show the static pressure acquisition portion 150 provided on the electrical connector 100. The static pressure acquisition portion 150 includes a static pressure measuring hole 151 provided in the first side 112, a static pressure output port 153 provided in the first connection portion 120, and a static pressure transmission channel 152 provided in the main body portion 110 to allow the static pressure measuring hole 151 to be in communication with the static pressure output port 153. The static pressure measuring hole 151 is provided in the first side 112 and is arranged in such a manner that no dynamic pressure component is generated by the fluid in the static pressure measuring hole 151. Preferably, an axial direction of the static pressure measuring hole 151 is perpendicular to the flow direction of the fluid. Alternatively, the static pressure measuring hole 151 may also be provided in the second side 113. The number of the static pressure measuring holes 151 may be more than one. In the case that multiple static pressure measuring holes 151 are provided, the static pressure measuring holes 151 may be provided in one or both of the first side 112 and the second side 113. Further, the static pressure measuring holes 151 may be provided at any positions on the first side 112 and/or the second side 113. Preferably, the static pressure measuring hole 151 is provided at a position close to the total pressure measuring hole 141 in the flow direction of the fluid, for example, the static pressure measuring hole 151 is provided on a straight line in the flow direction of the fluid. Preferably, the axial direction of the static pressure measuring hole 151 perpendicularly intersects the axial direction of the total pressure measuring hole 141. The static pressure transmission channel 152 is provided in the main body portion 110, and the static pressure transmission channel 152 has an entrance in communication with the static pressure transmission channel 152 and an exit extending to the first connection portion 120 of the electrical connector 100, for transmitting the static pressure to the static pressure output port 153. The static pressure transmission channel 152 may be directly provided in the main body portion 110. Alternatively, by taking the static pressure transmission channel 152 provided in the first side 112 as an example, the static pressure transmission channel 152 is an independent pipeline, and is embedded in a preformed slot in the electrical connector 100 in such a manner that a top surface of the static pressure transmission channel 152 does not go beyond a surface of the first side 112, and preferably, the top surface of static pressure transmission channel 152 is flush with the surface of the first side 112. Furthermore, the top surface of the static pressure transmission channel 152 has the same surface structure as the surface of the first side 112, for example, an anti-corrosive layer is coated on the entire first side including the top surface of the static pressure transmission channel 152. Alternatively, the static pressure transmission channel 152 is an independent pipeline passing through a preformed channel provided in the electrical connector 100. The static pressure output port 153 is provided in the first connection portion 120 or the second connection portion 130 and is in communication with the exit of the static pressure transmission channel 152. As shown in FIG. 5, the static pressure output port 153 is provided in the end surface of the first connection portion 120. Alternatively, the static pressure output port 153 may also be provided in the end surface of the second connection portion 130. Alternatively, the static pressure output port 153 may be provided in the connection surface 122 or the connection surface 123 of the first connection portion 120 or in the connection surface 132 or the connection surface 133 of the second connection portion 130. As shown in FIG. 6, the static pressure output port 153 is provided in the connection surface 123 of the first connection portion 120. Further, the static pressure output port 153 and the total pressure output port 143 may be provided in the same connection portion or different connection portions. In the case that the static pressure output port 153 and the total pressure output port 143 extend out from the same connection portion, the static pressure output port 153 and the total pressure output port 143 may be provided in the same end and/or connection surface or in different ends and/or connection surfaces. For example, the static pressure output port 153 may be provided in the connection surface 123 and the total pressure output port 143 may be provided in the connection surface 122, or the static pressure output port 153 may be provided in the connection surface 122 and the total pressure output port 143 may be provided in the connection surface 123.

The pressure applied by the fluid on the upstream side 111 is acquired and measured in the present application based on the principle of a pitot-static tube. The total pressure measuring hole 141 and the total pressure transmission channel 142 are in communication with each other to form a pitot tube, and the static pressure measuring hole 151 and the static pressure transmission channel 152 are in communication with each other to form a static tube. By the total pressure output port 143 and the static pressure output port 153, the dynamic pressure, that is, a difference between the total pressure and the static pressure, of the fluid acting at the total pressure measuring hole 141 may be obtained. By substituting the dynamic pressure of the fluid into a Bernoulli equation, the flow speed of the fluid at the total pressure measuring hole 141 may be derived, and further the flow rate may be calculated.

FIG. 7 shows the back pressure acquisition portion 210 provided on the electrical connector 100. As described hereinbefore, in order to calculate the resistance coefficient $C_d$, the back pressure acquisition portion 210 may be further provided to acquire and measure a downstream side pressure $p_l$ of the electrical connector 100. The back pressure acquisition portion 210 includes a back pressure measuring hole 211 provided in the downstream side 116, a back pressure output port 213 provided in the connection portion (not indicated) and a back pressure transmission channel 212 provided in the main body portion (not indicated) to allow the back pressure measuring hole 211 to be in communication with the back pressure output port 213. The back pressure measuring hole 211 is provided in the downstream side 116, and the downstream side 116 is away from the direction of the upwind inflow in the flow channel, and the back pressure measuring hole 211 has an opening opposite to the direction of the inflow and is configured to acquire and measure the back pressure (or the base pressure) generated by the fluid on the downstream side 116. The back pressure measuring hole 211 is a smooth hole without burrs, and the shape of the hole may be a circle, an ellipse, a polygon or the like. The back pressure measuring hole 211 may be arranged at any positions on the downstream side 116. The back pressure transmission channel 212 is provided in the main body portion 110, and the back pressure transmission channel 212 has an entrance in communication with the back pressure measuring hole 211 and an exit extending to the connection portion of the electrical connector 100, for transmitting the back pressure to the back pressure output port 213. The back pressure transmission channel 212 may be directly formed in the main body portion. Alternatively, the back pressure transmission channel 142 is an independent pipeline and embedded in a slot preformed in the electrical connector 100 in such a manner that a top surface of the back pressure transmission channel 212 does not go beyond a surface of the downstream side 116, and preferably, the top surface of the back pressure transmission channel 212 is flush with the surface of the downstream side 116. Furthermore, the top surface of the back pressure transmission channel 212 has the same surface structure as the surface of the downstream side 116, for example, a coating such as an anti-corrosive layer is coated on the entire downstream side 116 including the top surface of the back pressure transmission channel 212. Alternatively, the back pressure transmission channel 212 is an independent pipeline passing through a preformed channel provided in the electrical connector 100. The back pressure output port 213 may be provided in the surface of the main body portion 110 or in the surface of each of the first connection portion 120 and the second connection portion 130. In order to avoid affecting the flow field, preferably the back pressure output port 213 is provided in the first connection portion 120 or the second connection portion 130 and is in communication with the exit of the back pressure transmission channel 212. Similarly to the total pressure output port 143 and the static pressure output port 153, the back pressure output port 213 may be provided in the end surface of the first connection portion 120 or the second connection portion 130. Alternatively, the back pressure output port 213 may further be provided in the connection surfaces 122, 123 of the first connection portion 120 or in the connection surfaces 132, 133 of the second connection portion 130.

According to the present application, the electrical connector 100 itself is electricity conductive. In the case that the charged element connected to the electrical connector 100 is energized with alternating current, a current density in a cross-section of the electrical connector 100 is not uniform, and a skin effect may occur and the current is mainly concentrated on a surface of the electrical connector 100, the current density on a central region of the cross-section of the electrical connector 100 is small and is practically small even when a high-frequency current is transmitted, thus the electrical connector 100 has no application value. Therefore, by providing the total pressure acquisition portion 140, the static pressure acquisition portion 150 and the back pressure acquisition portion 210 in the electrical connector 100, materials for manufacturing the electrical connector 100 are saved and a path for measuring and sampling the pressure (or the flow speed) is formed, the function of conducting electricity of the electrical connector 100 may not be affected and the electrical connector 100 may achieve a function of acquiring and measuring a flow state of the fluid.

Further, when the electrical connector 100 transmits electric energy in the fluid, in addition to the longitudinal vibration caused by the action of the fluid pressure described above, a coupled vibration of the electrical connector 100 with the fluid may be further caused, causing a Karman vortex street destruction phenomenon. According to the Karman vortex street principle, as shown in FIG. 1, when the electrical connector 100 is located in the fluid, the Karman vortex street phenomenon may be generated on the first side 112 and the second side 113 by the fluid flowing through the first side 112 and the second side 113 respectively, which causes that regular downstream shedding of a vortex occurs on the two sides, and the fluid located at a side where the shedding of the vortex occurs has an energy loss due to the backflow phenomenon, thus having a flow speed slower than the flow speed of the fluid at another side where no shedding of the vortex occurs. According to the Newton's cooling law formula for quantitatively calculating a convective heat exchange speed in heat transfer theory, the convective heat exchange speed is directly proportional to the 0.8th power of the flow speed of the fluid. Therefore, in the case the shedding of the vortex occurs alternately on the two sides of the electrical connector 100, a temperature of a side wall where the shedding of the vortex occurs is inconsistent with a temperature of a side wall where no shedding of the vortex occurs. Such temperature change frequency corresponds to the frequency of an alternating force applied by the fluid on the two sides and a lateral vibration frequency of the electrical connector 100 in the direction perpendicular to the flow direction of the fluid and caused by the alternating force, thus measurement of the lateral vibration frequency of the electrical connector may be achieved by measuring the temperature change frequency. In the conventional technology, a pressure detector or a pressure sampler is independently provided in the flow channel to acquire a reliable pressure indication value at a signal source. Such interventional detection may affect the measuring value to a certain extent, and cannot reveal the condition of the original state of a fluid field in the flow channel. In the present application, the lateral vibration frequency of the electrical connector 100 is measured according to the Karman vortex street principle. Through the temperature sensing elements respectively provided on the first side 112 and the second side 113, the temperature change caused by the Karman vortex street phenomenon on the two sides is obtained, and based on the temperature change described above, the frequency of the alternating force acting on the two sides and the lateral vibration frequency of the electrical connector 100 are calculated. The electrical connector 100 according to the embodiment of the present application itself has the function of acquiring and measuring temperature parameters, and does not have to arrange an independent detector in the flow channel, thus, the electrical connector 100 may be configured to measure the state parameter of the fluid more accurately.

Figure 8:
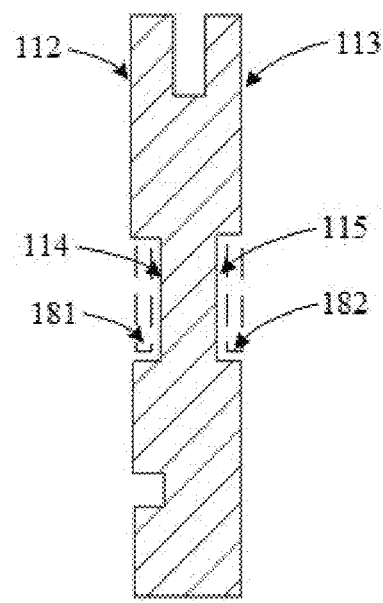
FIG. 8 is a schematic cross-sectional view of an electrical connector according to another embodiment of the present application.

FIG. 5 and FIG. 6 show a first temperature sensing element 181 and a second temperature sensing element 182 of the electrical connector 100. The first temperature sensing element 181 and the second temperature sensing element 182 are respectively arranged on the first side 112 and the second side 113, for acquiring temperatures of the fluid flowing through the first side 112 and the second side 113 respectively. FIG. 8 is a schematic cross-sectional view of the electrical connector 100, and FIG. 8 further shows the arrangement of the first temperature sensing element 181 and the second temperature sensing element 182. In FIG. 8, the first temperature sensing element 181 and the second temperature sensing element 182 are respectively provided at opposite positions on the first side 112 and the second side 113 in an electrically insulated manner, for example, provided at a central position of the first side 112 and a central position of the second side 113. Alternatively, the first temperature sensing element 181 and the second temperature sensing element 182 may be provided at any positions of the first side 112 and the second side 113, and the number of the first temperature sensing elements 181 and the number of the second temperature sensing elements 182 may be more than one. Furthermore, the first temperature sensing element 181 and the second temperature sensing element 182 should be maintained in a positional relationship of being opposite to each other and have a one-to-one correspondence in number. In order to prevent the first temperature sensing element 181 and the second temperature sensing element 182 from impeding the fluid flowing through a sensing surface of the first temperature sensing element 181 and the fluid flowing through a sensing surface of the second temperature sensing element 182, an outer surface of the first temperature sensing element 181 and an outer surface of the second temperature sensing element 182 do not go beyond the surface of the first side 112 and the surface of the second side 113. Preferably, the outer surface of the first temperature sensing element 181 is flush with the surface of the first side 181, and the outer surface of the second temperature sensing element 182 is flush with the surface of the second side 113. Furthermore, the outer surface of the first temperature sensing element 181 and/or the outer surface of the second temperature sensing element 182 has the same surface structure, for example the same roughness, as the surface of the first side 112 where the first temperature sensing element 181 is located and/or the surface of the second side 113 where the second temperature sensing element 182 is located. In the process that the fluid flows through the sides, a condition of a fluid boundary layer contacting with the first side 112 and the second side 113 does not change, and thus an original flow field is not destroyed. In order to install the first temperature sensing element 181 and the second temperature sensing element 182, a first temperature sensing element mounting recess 114 and a second temperature sensing element mounting recess 115 may be provided at opposite positions on the first side 112 and the second side 113. In order to maintain the insulation between the temperature sensing elements and the electrical connector 100, it is preferable that an electrically insulation layer may be coated on each of a surface of the first temperature sensing element mounting recess 114 and a surface of the second temperature sensing element mounting recess 115.

According to the present application, in addition to transmitting electric energy, the electrical connector 100 may be configured to measure the frequency of an alternating force applied by the fluid flowing through the electrical connector 100 in the flow channel on the electrical connector 100 in the direction perpendicular to the flow direction of the fluid, without introducing an independent sensor and a test system thereof and thus not changing the flow field where the electrical connector 100 is located, and further a frequency parameter of the lateral vibration induced by the alternating force of the electrical connector 100 is obtained.

Figure 9:
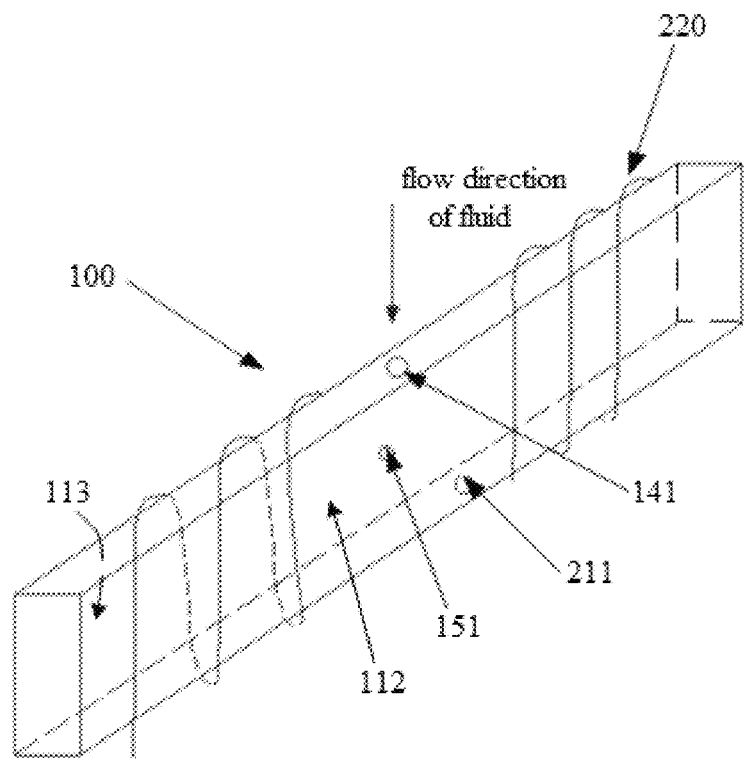
FIG. 9 is a partially schematic view of an electrical connector wound with a helical wire according to the present application.

Further, it may be known from an inducing mechanism of the lateral vibration of the electrical connector 100 in the flow channel of the fluid that, the lateral vibration is caused by a Karman vortex street effect generated by the fluid on the two sides 112,113 of the electrical connector 100. When the fluid flows through the electrical connector 100, alternating shedding of the vortex may occur on the two sides 112,113 of the electrical connector 100 in an orderly manner. For the electrical connector 100, a helical protrusion may be provided on the surface of the electrical connector 100 to reduce the lateral vibration of the electrical connector 100. As shown in FIG. 9, a helical wire 220 with a certain pitch is wound around the electrical connector 100, which may destroy the orderliness of the alternating shedding of the vortex occurring on the two sides 112,113 of the electrical connector 100, so that the vortexes on the two sides 112,113 of the electrical connector 100 may shed synchronously or shed alternately in an irregular manner, thus the lateral vibration of the electrical connector 100 is suppressed. The pitch of the helical wire 220 may be adjusted according to the lateral vibration frequency of the electrical connector 100. Preferably, the pitch of the helical wire 220 is optimally designed based on a maximum lateral vibration amplitude of the electrical connector 100. Further, the helical wire 220 may be made of a metallic material, however, the helical wire 220 is not allowed to form a closed circuit. Preferably, the helical wire 220 may be made of a non-conductive material, for example, a non-metallic material. Alternatively, the helical protrusion may further be integrally formed on the surface of the electrical connector 100. For example, in the case that a coating such an anti-corrosive layer is coated on the surface of the electrical connector 100, the helical protrusion is integrally formed on the surface of the electrical connector 100 by an impregnation process. Preferably, the position of the helical protrusion should be configured to avoid the region, where at least one of the measuring holes 141,151,211 is located, on the surface of the electrical connector 100, so as to avoid affecting the flow field around the measuring holes to avoid causing a measurement error.

Figure 10:
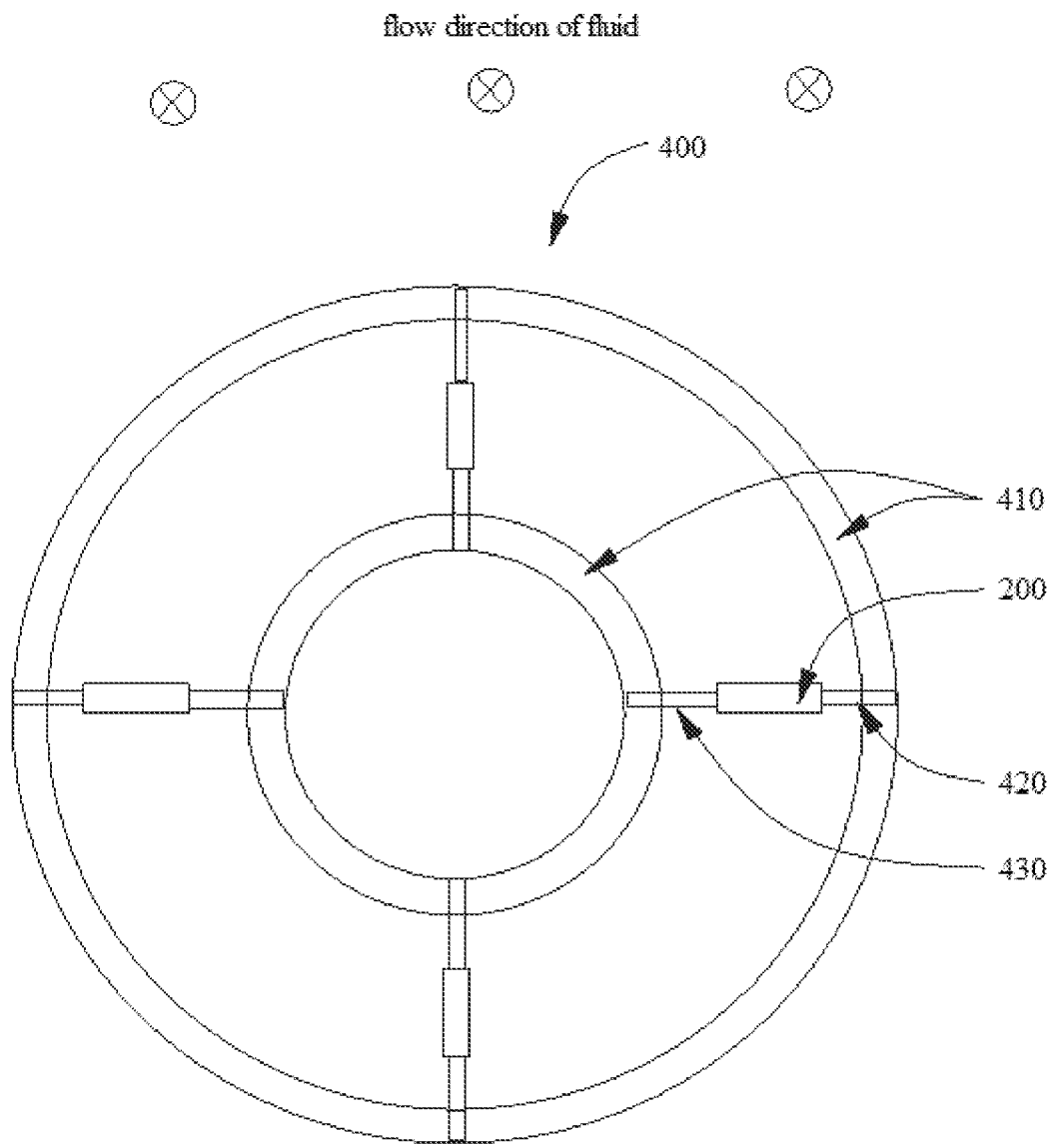
FIG. 10 is a front view of an electrical connector in a state of being installed in the fluid channel according to another embodiment of the present application.

FIG. 10 is a schematic view of an electrical connector 400 according to another embodiment of the present application. The electrical connector 400 includes a main body portion 410 and connection portions 420,430. The main body portion 410 is annular. Each of the connection portions 420,430 has an end connected to the annular main body portion 410 and another end connected to an electric heating tube 200. Except for the above, the electrical connector 400 has the same structure as the electrical connector 100 shown in FIG. 1, which will not be described herein.

FIGS. 11 to 14 show a fluid state test device according to the present application. The fluid state test device according to the present application may be configured to process a pressure signal and a temperature signal and the like acquired by the electrical connector 100, and further the state of the fluid is obtained. For the purpose of clear illustration, FIGS. 11 to 14 respectively show processors, configured to process the pressure signal and the temperature signal acquired by the electrical connector 100, and so on.

Figure 11:
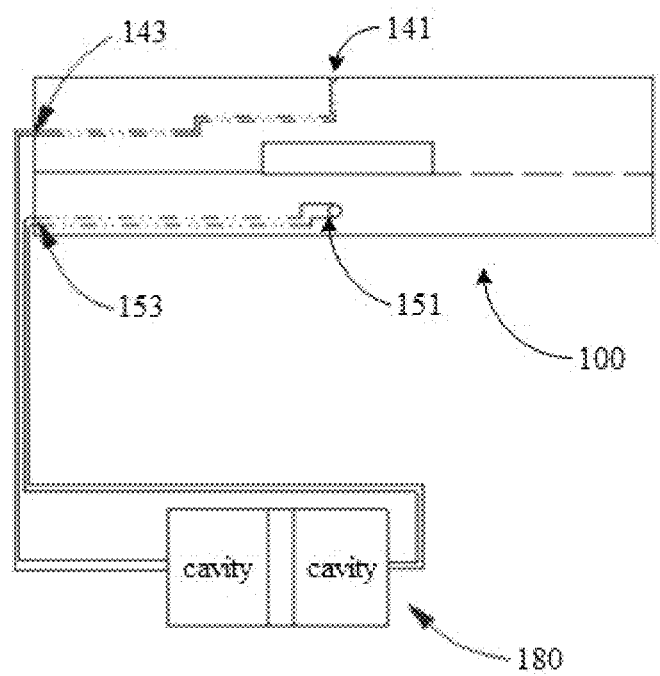
FIG. 11 is a schematic view of a fluid state test device according to an embodiment of the present application.

As shown in FIG. 11, the fluid state test device includes the electrical connector 100 and a first pressure measurement portion 180. The first pressure measurement portion 180 is connected to the total pressure output port 143 and the static pressure output port 153 of the electrical connector 100, for measuring pressure values acquired from the total pressure output port 143 and the static pressure output port 153. In this embodiment, the first pressure measurement portion 180 is a diaphragm differential pressure sensor, and the diaphragm differential pressure sensor includes two cavities separated by a diaphragm, and the two cavities are respectively in communication with the total pressure output port 143 and the static pressure output port 153 through the pressure transmission channels. The diaphragm differential pressure sensor may output a differential pressure, that is, the dynamic pressure, between the total pressure and the static pressure. Alternatively, the first pressure measurement portion 180 may include two pressure sensors, that is, a first pressure sensor and a second pressure sensor, respectively. The first pressure sensor is connected to the total pressure output port 143 and the second pressure sensor is connected to the static pressure output port 153, for measuring the total pressure and the static pressure of the fluid respectively. Furthermore, the fluid state test device further includes a flow speed calculation unit (not shown in the figure), and the flow speed calculation unit may calculate the flow speed of the fluid flowing through the electrical connector 100 based on the differential pressure output by the differential pressure sensor or based on the dynamic pressure and the static pressure. Furthermore, the fluid state test device may further calculate the flow rate of the fluid flowing through the electrical connector 100 based on the flow speed. Such measurements of the state of the fluid contribute to acquiring information about the longitudinal vibration of the electrical connector 100, and further the state of the fluid may be adjusted or the structure of the electrical connector 100 may be designed, thus the longitudinal vibration of the electrical connector 100 is adjusted and improved.

Figure 12:
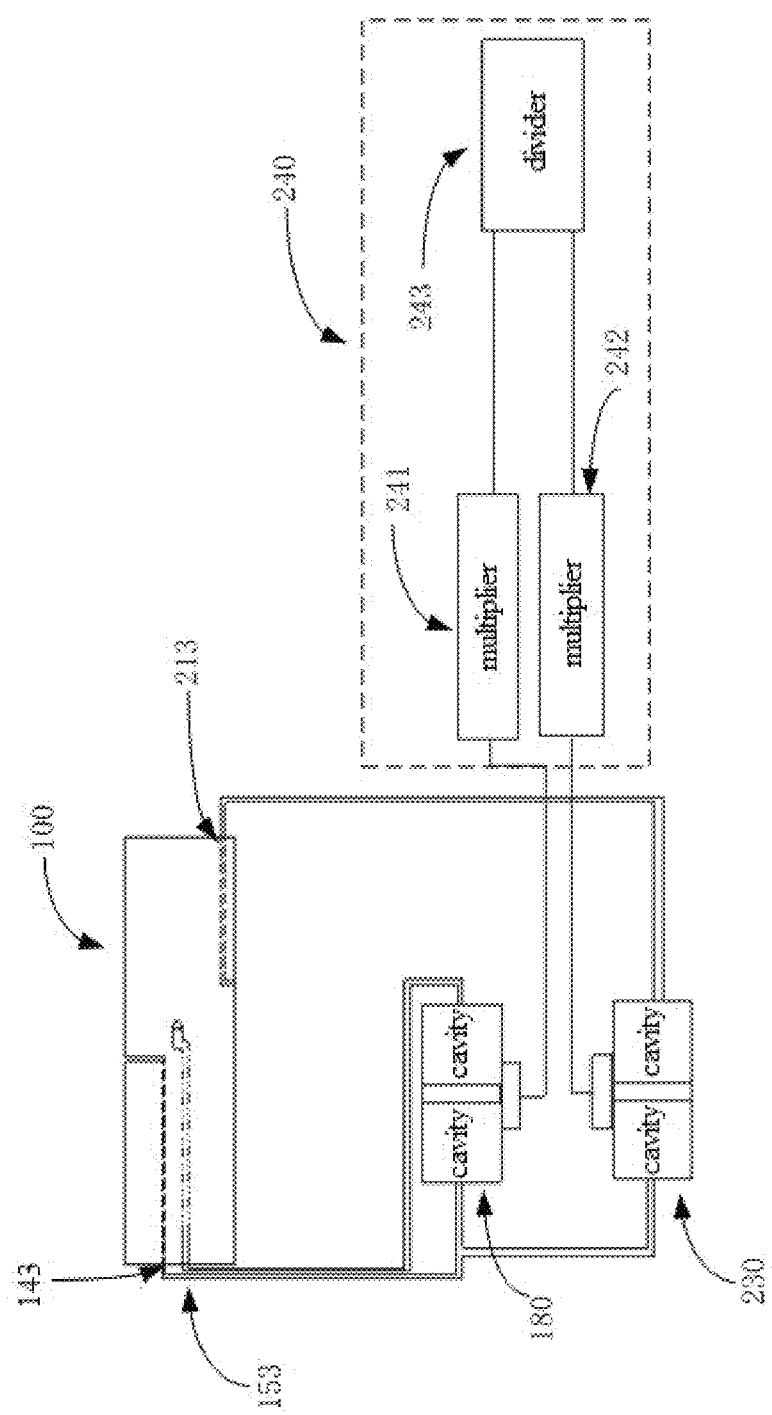
FIG. 12 is a schematic view of a fluid state test device according to another embodiment of the present application.

As shown in FIG. 12, in addition to the first pressure measurement portion 180, the fluid state test device may further include a second pressure measurement portion 230. The second pressure measurement portion 230 is connected to the total pressure output port 143 and the back pressure output port 213 of the electrical connector 100, for measuring the value of a differential pressure between the total pressure output port 143 and the back pressure output port 213. A pressure measurement structure of the second pressure measurement portion 230 is the same as the structure of the first pressure measurement portion 180 through which the pressure of each of the total pressure acquisition portion 140 and the static pressure acquisition portion 150 is measured. In FIG. 12, the second pressure measurement portion 230 is a diaphragm differential pressure sensor, and the diaphragm differential pressure sensor includes two cavities separated by a diaphragm, and the two cavities are respectively in communication with the total pressure output port 143 and the back pressure output port 213 through the pressure transmission channels. The diaphragm differential pressure sensor may output a differential pressure between the total pressure and the back pressure. Alternatively, the second pressure measurement portion 230 may include two pressure sensors, that is, a first pressure sensor and a second pressure sensor. The first pressure sensor is connected to the total pressure output port 143 and the second pressure sensor is connected to the back pressure output port 213, for measuring the total pressure and the back pressure of the fluid respectively. Furthermore, the fluid state test device further includes a resistance coefficient calculation unit 240. The dynamic pressure is calculated by a multiplier 241 of the resistance coefficient calculation unit 240, based on a product of a dynamic pressure (the difference between the total pressure and the static pressure) obtained by the first pressure measurement portion 180 and the projection area of the upstream side. Then, the resistance of the electrical connector 100 is calculated by a multiplier 242, based on a product of a differential pressure (a difference between the total pressure and the back pressure) obtained by the second pressure measurement portion 230 and the projection area of the upstream side. Finally, the resistance coefficient $C_d$, that is, resistance/dynamic pressure, of the electrical connector 100 in the flow channel of the fluid is calculated by a divider 243, further, a specific thickness dimension and a specific width dimension of the electrical connector 100 are obtained, thus, optimal design of a characteristic scale of the electrical connector 100 is achieved.

Figure 13:
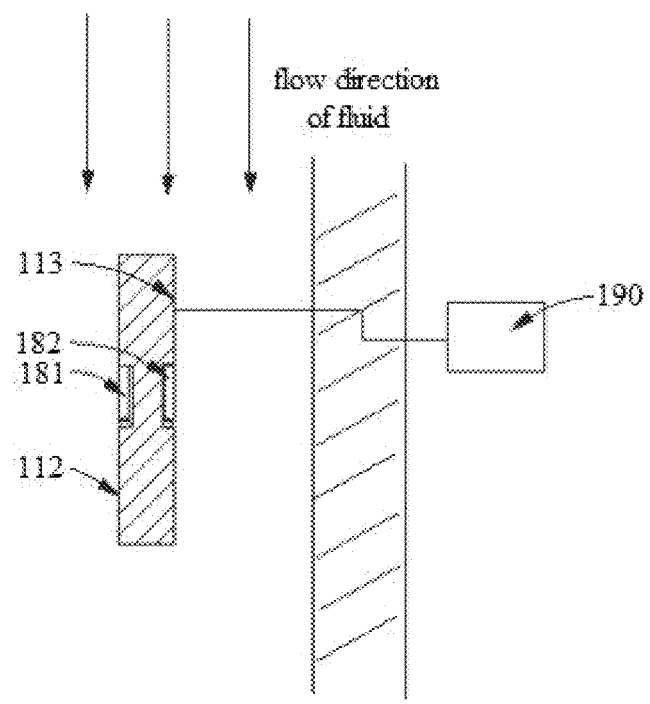
FIG. 13 is a schematic view of a fluid state test device according to another embodiment of the present application.

As shown in FIG. 13, the fluid state test device may further include a frequency calculation unit 190. The frequency calculation unit 190 is connected to the first temperature sensing element 181 and the second temperature sensing element 182, for measuring the lateral vibration frequency of the electrical connector. The frequency calculation unit 190 is configured to receive a signal indicative of the temperature from each of the first temperature sensing element 181 and the second temperature sensing element 182 and calculate the frequency of the alternating force applied by the fluid on the electrical connector 100 in the direction perpendicular to the flow direction of the fluid, that is, the lateral vibration frequency of the electrical connector 100. The signal, indicative of the temperature, from each of the first temperature sensing element 181 and the second temperature sensing element 182 is led to the frequency calculation unit 190 by a respective sensor lead (not shown in the figure). In order to prevent the sensor lead from impeding the fluid flowing through each of the first side 112 and the second side 113 without affecting the measurement accuracy, the sensor lead of each of the two temperature sensing elements may be configured to pass through a lead channel preformed in the electrical connector 100. Alternatively, the sensor lead is arranged in a slot formed in the surface of the main body portion 110, and the sensor lead does not go beyond the surface of the first side 112 and the surface of the second side 113, preferably, a peripheral top portion of the sensor lead is flush with the surface of the first side 112 and the surface of the second side 113. In this way, the fluid boundary layer at a side of the electrical connector may not be affected. The sensor lead may be led out from the connection surface (or surfaces) or the end (or ends) of one or two of the first connection portion 120 and the second connection portion 130. Preferably, the sensor lead of the first temperature sensing element 181 and the sensor lead of the second temperature sensing element 182 may be led out from the same connection portion, that is, the first connection portion 120 or the second connection portion 130. Preferably, the frequency calculation unit 190 is provided outside the flow channel, and the sensor lead is configured to pass through a wall of the flow channel to be connected to the frequency calculation unit 190, thus providing the signal indicative of the temperature to the frequency calculation unit 190. Similarly, the first pressure measurement portion 180 and the second pressure measurement portion 230 and other signal processors may also be provided outside the wall of the flow channel, and may be connected to the total pressure acquisition portion 140, the static pressure acquisition portion 150 and the back pressure acquisition portion 210 by corresponding leads.

Figure 14:
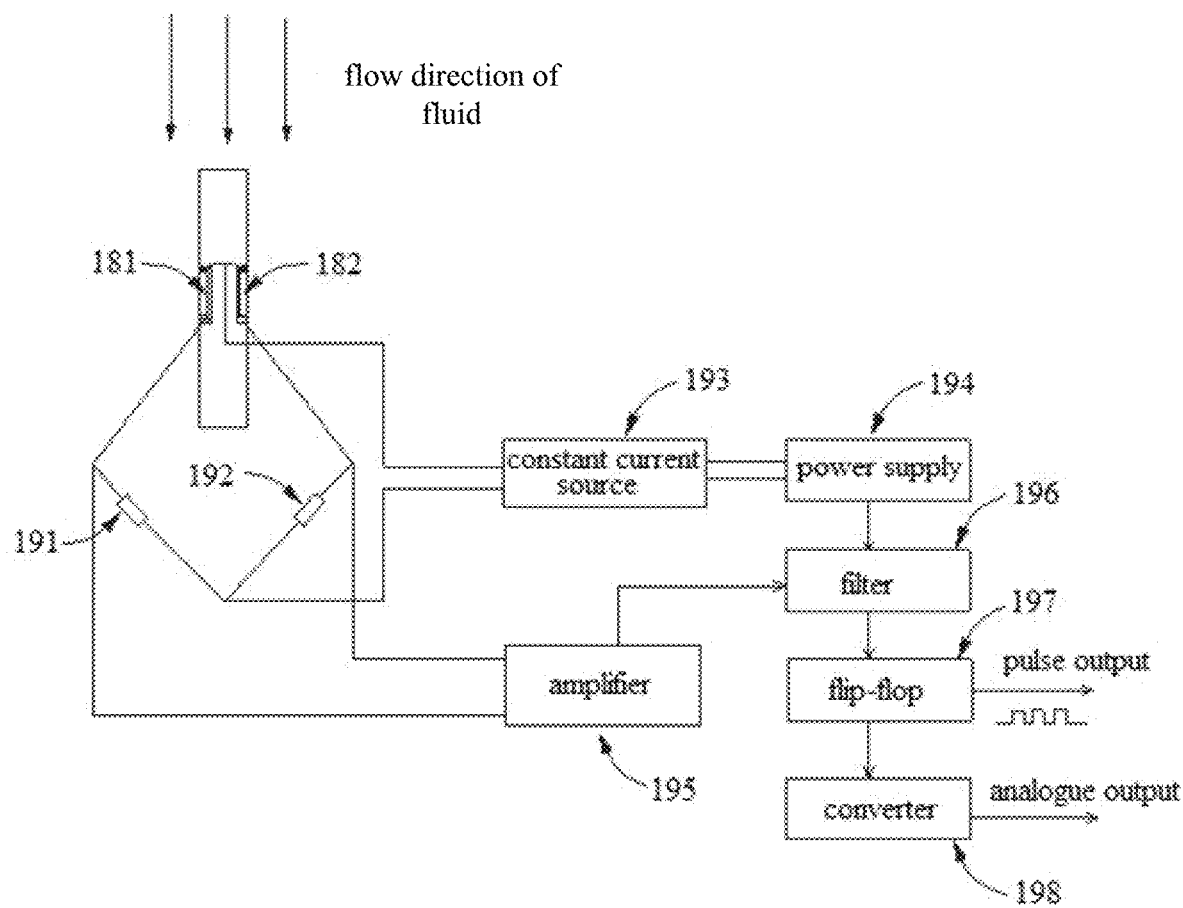
FIG. 14 is a schematic view of a circuit for a frequency calculation unit in the fluid state test device shown in FIG. 13.

FIG. 14 further shows the configuration of a circuit of the frequency calculation unit 190 according to an embodiment of the present application. The frequency calculation unit 190 includes a first bridge resistor 191, a second bridge resistor 192, a constant current source 193, a power supply 194, an amplifier 195, a filter 196, a flip-flop 197 and a converter 198. The first temperature sensing element 181, the first bridge resistor 191, the second bridge resistor 192 and the second temperature sensing element 182 are electrically connected in order into a bridge circuit. A node between the first temperature sensing element 181 and the second temperature sensing element 182 and a node between the first bridge resistor 191 and the second bridge resistor 192 are respectively connected to two electrodes of the constant current source 193. The constant current source 193 is connected to the power supply 194, for maintaining a current provided by the power supply 194 to the bridge circuit through the constant current source 193 constant. A node between the first temperature sensing element 181 and the first bridge resistor 191 and a node between the second temperature sensing element 182 and the second bridge resistor 192 are connected to the amplifier 195 by wires, for outputting a voltage signal to the amplifier 195. The first temperature sensing element 181 has the same structure as the second temperature sensing element 182. The first bridge resistor 191 and the second bridge resistor 192 may have the same resistance value, and a balanced electric bridge is adopted to measure, so that the voltage signal initially output is zero. Alternatively, the first bridge resistor 191 and the second bridge resistor 192 may have different resistance values, and an imbalanced electric bridge is adopted to measure, that is, the voltage signal initially output is not equal to zero. The first temperature sensing element 181 and the second temperature sensing element 182 are energized with constant current. In the case that Karman vortex street does not occur on each of the first side 112 and the second side 113 of the electrical connector 100 and the lateral vibration, in the direction perpendicular to the flow direction of the fluid, of the electrical connector 100 is not induced, the first temperature sensing element 181 has the same temperature as the second temperature sensing element 182, so that resistance values to which the first temperature sensing element 181 and the second temperature sensing element 182 correspond in the bridge circuit are equal and an input voltage of the amplifier 195 is zero. In the case that the Karman vortex street occurs on each of the first side 112 and the second side 113 of the electrical connector 100 and the lateral vibration, in the direction perpendicular to the flow direction of the fluid, of the electrical connector 100 is induced, the temperatures sensed by the first temperature sensing element 181 and the second temperature sensing element 182, on the first side 112 and the second side 113 are inconsistent due to downstream shedding of the vortex, such a difference in temperature causes the bridge circuit to output voltage to the amplifier 195. The voltage, after being processed by the filter 196 and the flip-flop 197, is output as a pulse signal indicative of the frequency of the alternating force acting on the side of the electrical connector 100, and an output frequency of the pulse signal represents the lateral vibration frequency of the electrical connector 100. The flip-flop 197 may further be connected to the converter 198, and thus the pulse signal is processed by the converter 198 to be output as an analogue signal. The analogue signal represents variation of the intensity of convective heat exchange of the fluid on the first side 112 and the second side 113. Preferably, the first temperature sensing element 181 and the second temperature sensing element 182 should both adopt an element with a small time constant, thus facilitates sensing of the frequency of the shedding of the vortex. Preferably, the temperature sensing element may be a thermistor which is sensitive to the temperature and may exhibit different resistance values at different temperatures. Alternatively, the temperature sensing element may also be a thermal resistor, a thermocouple, a fiber optic temperature sensor and the like. In other embodiments, the frequency calculation unit 190 may be embodied as any devices capable of measuring frequency, such as an oscilloscope.

Figure 15:
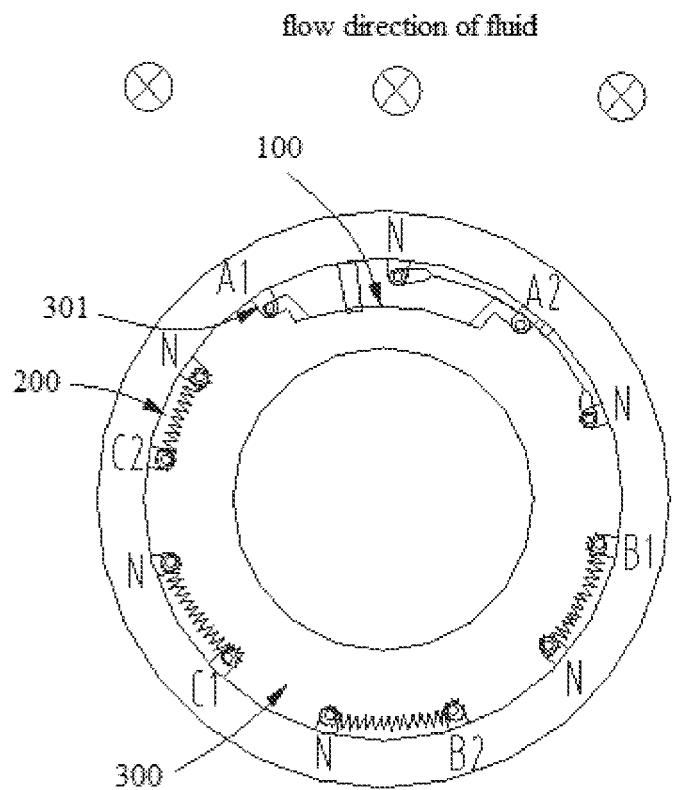
FIG. 15 is a schematic cross-sectional view of a fluid heat exchange system installed with the electrical connector according to the present application.

FIGS. 15 to 18 show a fluid heat exchange system provided with the electrical connector 100. The charged element is an electric heating element capable of generating heat, and in this embodiment, the charged element is the electric heating tube 200. As shown in FIG. 15, the fluid heat exchange system includes a circular ring shaped flow channel 300, multiple electric heating tubes 200 arranged in the fluid flow channel and multiple electrical connectors 100 configured to electrically connect the multiple electric heating tubes 200. The fluid flowing in the fluid flow channel 300 may be liquid or gas.

Figure 16:
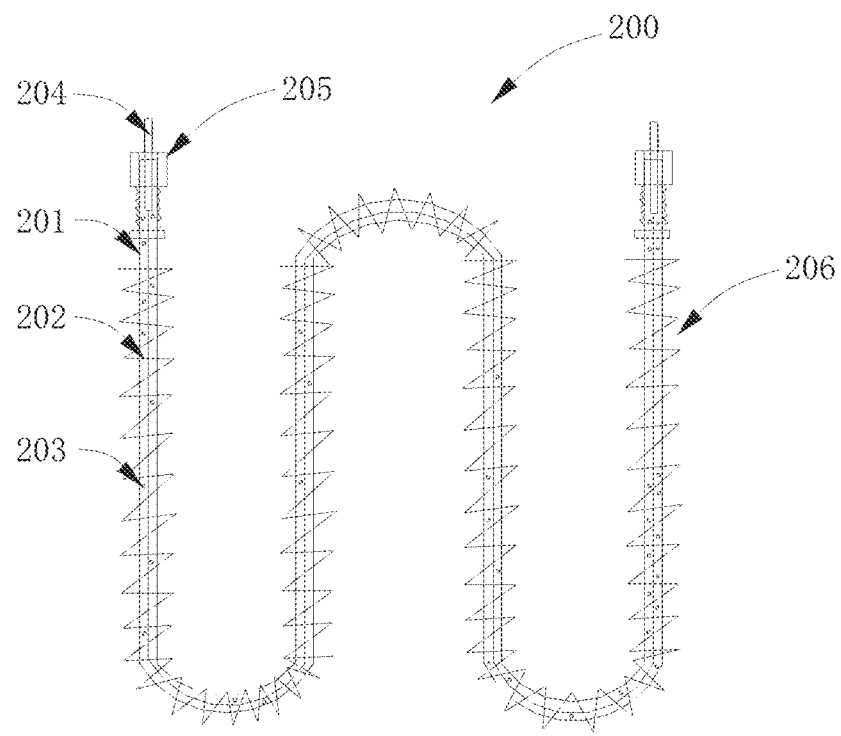
FIG. 16 is a schematic view showing the structure of an electric heating tube installed in the fluid heat exchange system shown in FIG. 15.

FIG. 16 shows the structure of the electric heating tube 200. The electric heating tube 200 includes a metal outer tube 201, a resistance wire 202 arranged in the metal outer tube 201, and a filler 203 filled in the metal outer tube 201. Crystalline magnesium oxide powder with a good insulativity and a good thermal conductivity is typically selected as the filler. In order to improve a heat dissipation effect of the metal outer tube 201, an outer periphery of the metal outer tube 201 is surrounded by a helical fin 206. The electric heating tube 200 is W-shaped. An outer periphery of each of two ends of the metal outer tube 201 is provided with threads, and each of the two ends passes through a connection hole in a fixed end 301 provided in an inner wall of the flow channel and is secured to the fixed end 301 by a nut, so that the electric heating tube 201 is fixed, in the direction parallel to the flow direction of the fluid, to the inner wall of the flow channel. Two electrodes 204 are respectively provided at the two ends of the metal outer tube 201. An outer periphery of the electrode 204 is provided with threads, to allow the electrode 204 to be connected to the electrical connector 100.

FIG. 15 shows a connection manner between the electrical connector 100 and the electrode 204 of the electric heating tube 200. The electrode 204 passes through the connection hole 121 provided in the first connection portion 120 or the connection hole 131 provided in the second connection portion 130 of the electrical connector 100, and the electrode 204 is secured to the electrical connector 100 by a nut. An insulation ceramic head 205 is further provided between the electrode 204 of the electric heating tube 200 and the end of the metal outer tube 201, for achieving electrical insulation between the electrical connector 100 and the metal outer tube 201.

Figure 17:
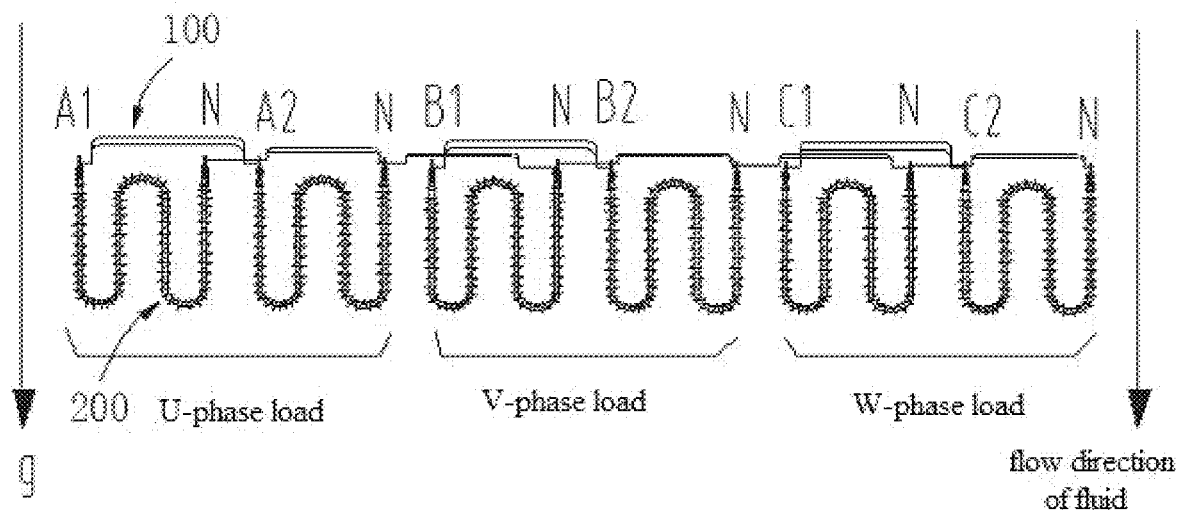
FIG. 17 is a schematic plane outspread view showing a disposition relationship between the electric heating tube in the fluid heat exchange system and the electrical connector according to the present application.
Figure 18:
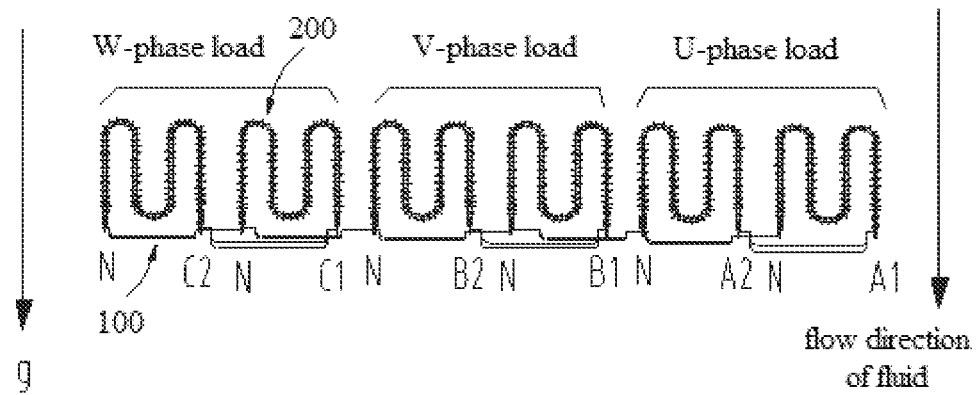
FIG. 18 is a schematic plane outspread view showing another disposition relationship between the electric heating tube in the fluid heat exchange system and the electrical connector according to the present application.

FIG. 17 shows a plane outspread structure of the electric heating tube 200 and the electrical connector 100 arranged in the flow channel 300. In the figure, g indicates a downward gravity, which is consistent with the flow direction of the fluid longitudinally passing through the electric heating tube 200, and the electrodes of the electric heat source and the electrical connector thereof are located upstream of the helical fin of the electric heating tube. As shown in the figure, by taking six electric heating tubes 200 as an example, the six electric heating tubes 200 are evenly distributed in the fluid flow channel 300 in a circumferential direction. In the fluid heat exchange system, the six electric heating tubes 200 as electric energy loads may be supplied with split-phase power supply, for example, the split phases are phase A (i.e. phase U), phase B (i.e. phase V) and phase C (i.e. phase W). As shown in the figure, two electric heating tubes 200 are electrically connected between the phase A and neutral wires N, and the two electric heating tubes 200 are respectively connected between a power supply phase wire A1 and a neutral wire N and between a power supply phase wire A2 and a neutral wire N. Two electric heating tubes 200 are electrically connected between the phase B and the neutral wires N, and the two electric heating tubes 200 are respectively connected between a power supply phase wire B1 and a neutral wire N and between a power supply phase wire B2 and a neutral wire N. Two electric heating tubes 200 are electrically connected among the phase C and the neutral wires N, and the two electric heating tubes 200 are respectively introduced between a power supply phase wire C1 and a neutral wire N and between a power supply phase wire C2 and a neutral wire N. Alternatively, other number of electric heating tubes may be electrically connected between the phase A, the phase B, the phase C and the neutral wires N. Further, in addition to a three-phase power supply manner, other split-phase power supply manners may be used. The electrodes of the electric heating tube 200 are arranged upward, so that the electrical connector 100 is located upstream with respect to the electric heating tube 200 in the flow direction of the fluid. Alternatively, as shown in FIG. 18, the electrodes of the electric heating tube 200 are all arranged downward, so that the electrical connector 100 is located downstream with respect to the electric heating tube 200 in the flow direction of the fluid. The width of the electrical connector is greater than the thickness of the electrical connector, and the electrical connector is located at a lee side downstream of the helical fin of the electric heating tube. By taking a U-phase load in FIG. 17 as an example, two electric heating tubes are connected in parallel to each other, that is, phase wires of the two electric heating tubes are connected by the electrical connector 100 and the neutral wires of the two electric heating tubes are connected by the electrical connector 100. The two adjacent electrical connectors 100 are spaced apart from each other. Alternatively, the electrical connectors 100 in the same phase load may further be connected in series or connected in parallel-series by the electrical connector 100.

By using the electrical connector 100 and the fluid state test device according to the present application, the flow state of the fluid may be acquired, measured and monitored, and accordingly the state of the fluid may be adjusted. In one aspect, by the total pressure acquisition portion 140 and the static pressure acquisition portion 150 provided on the electrical connector 100, the pressure of the fluid flowing through a certain measurement position of the electrical connector 100 may be collected; and the flow speed of the fluid at the measurement position may be acquired based on the dynamic pressure applied by the fluid on the electrical connector 100, that is, the difference between the total pressure and the static pressure. In the fluid heat exchange system, the flow speed of the fluid is an important factor affecting the heat exchange efficiency between the electrical connector 100 and the fluid. If the flow speed is too fast, in one aspect, impact on the electrical connector 100 may be caused and vibration in the flow direction of the fluid is caused, resulting in fatigue failure of the electrode of the electric heating tube, and in another aspect, the pressure loss may be increased, thus may both weaken the heat exchange effect directly. In another aspect, by the back pressure acquisition portion 210 provided on the electrical connector 100, the resistance coefficient of the electrical connector 100 to the fluid may be obtained, and based on the resistance coefficient, the feature size of the electrical connector having a rectangular cross-section is optimally designed, thus the effects of reducing the resistance and weakening the longitudinal vibration are achieved.

The electrical connector 100 and the fluid state test device according to the present application may be configured to measure and monitor the flow speed of the fluid, so as control the flow speed of the fluid within a range which facilitates the heat exchange efficiency and ensures the electrode not to be damaged. For example, the lateral vibration of the electrical connector 100 is a main reason for the fatigue failure of the electrode of the electric heating tube connected to the electrical connector 100. By the temperature sensing elements provided on the two sides of the electrical connector 100, the electrical connector 100 in this embodiment of the present application may be configured to measure the lateral vibration frequency of the electrical connector 100, thus the lateral vibration frequency of the electrical connector 100 may be adjusted by controlling the flow state of the fluid to control the lateral vibration frequency within a range which may not adversely affect the electrode of the electric heating tube. Also, since such acquisition of the vibration frequency may provide a valuable fatigue test basis for an insulated fixation manner of the insulation ceramic head and an insulated fixation manner of fixing the led-out electrode to a casing, a test method may be performed using the electrical connector 100 according to the embodiment of the present application. By simulating a real environment in which the electric heating tube is located and by changing a transmission speed of the fluid with a speed regulator, the frequency of a lateral vibration perpendicular to the flow direction of the fluid, causing by the Karman vortex street occurring at different flow speeds, of the electrical connector with a different width and a different thickness or another non-circular structure at a certain scale is obtained, and further the law of fluid flow-induced vibration is obtained. Based on the test method, the flow state of the fluid, the structure of the electrical connector and the like are pre-designed, to avoid a destruction effect of high-frequency vibration of the electrical connector on the flow field.

Although the present application is described with reference to exemplary embodiments, it should be understood that the present application is not limited to configurations and methods of the embodiments described above. On the contrary, the present application is intended to cover various modifications and equivalent configurations. In addition, although various elements and method steps of the present application disclosed are shown in various exemplary combinations and configurations, other combinations including more or less elements or methods are also deemed to fall within the scope of the present application.

The invention claimed is:

1. An electrical connector configured to measure a state of a fluid in a flow channel, comprising:
a main body portion,
connection portions,
a total pressure acquisition portion, and
a static pressure acquisition portion, wherein
the connection portions allow the main body portion to be electrically connected to a charged element provided in the flow channel;
the total pressure acquisition portion comprises a total pressure measuring hole provided in a first part, facing a flow direction of the fluid, of the main body portion; and
the static pressure acquisition portion comprises a static pressure measuring hole provided in a second part, parallel to the flow direction of the fluid, of the main body portion,
a first pressure measurement portion connected to the total pressure measuring hole and the static pressure measuring hole respectively for measuring a pressure state of the fluid.

2. The electrical connector according to claim 1, wherein the main body portion comprises an upstream side, a first side and a second side, the upstream side faces the flow direction of the fluid, the first side and the second side are parallel to the flow direction of the fluid, and the first part is located on the upstream side, and the second part is located on at least one of the first side and the second side.

3. The electrical connector according to claim 2, wherein the upstream side is a flat surface or a curved surface.

4. The electrical connector according to claim 3, wherein a surface where the first part is located is perpendicular to the flow direction of the fluid.

5. The electrical connector according to claim 2, wherein the first side and the second side are parallel to each other, and both the first side and the second side are flat surfaces or curved surfaces.

6. The electrical connector according to claim 2, wherein the total pressure measuring hole is provided at a central position of the upstream side.

7. The electrical connector according to claim 2, further comprising:

a first temperature sensing element, and
a second temperature sensing element, wherein
the first temperature sensing element and the second temperature sensing element are respectively provided at mutually opposite positions on the first side and the second side in an electrically insulated manner.

8. The electrical connector according to claim 7, wherein an outer surface of the first temperature sensing element is flush with the first side, an outer surface of the second temperature sensing element is flush with the second side, the outer surface of the first temperature sensing element has the same surface structure as the first side, and the outer surface of the second temperature sensing element has the same surface structure as the second side.

9. The electrical connector according to claim 7, wherein a first temperature sensing element mounting recess and a second temperature sensing element mounting recess are respectively provided in the first side and the second side.

10. The electrical connector according to claim 9, wherein an electrically insulation layer is provided on each of a surface of the first temperature sensing element mounting recess and a surface of the second temperature sensing element mounting recess.

11. The electrical connector according to claim 1, wherein a size of the main body portion in a direction parallel to the flow direction of the fluid is greater than a size of the main body portion in a direction perpendicular to the flow direction of the fluid.

12. The electrical connector according to claim 11, wherein a cross-section of the main body portion in the direction perpendicular to the flow direction of the fluid is rectangular, and a ratio of width to thickness of the main body portion is greater than 4.

13. The electrical connector according to claim 1, wherein a size of each of the connection portions in a direction perpendicular to the flow direction of the fluid is greater than a size of the main body portion in a direction perpendicular to the flow direction of the fluid.

14. The electrical connector according to claim 13, wherein the connection portions are located at ends of the main body portion, and a twist portion is provided between each of the connection portions and the main body portion to allow the connection portion to twist by a certain angle with respect to the main body portion.

15. The electrical connector according to claim 14, wherein each of the connection portions is twisted by 90 degrees with respect to the main body portion.

16. The electrical connector according to claim 1, wherein an axial direction of the total pressure measuring hole is parallel to the flow direction of the fluid.

17. The electrical connector according to claim 16, wherein the axial direction of the total pressure measuring hole perpendicularly intersects an axial direction of the static pressure measuring hole.

18. The electrical connector according to claim 1, wherein the total pressure acquisition portion further comprises a total pressure output port and a total pressure transmission channel, the total pressure output port is provided in one of the main body portion and the connection portions, and the total pressure transmission channel is provided in the main body portion and/or the connection portions to allow the total pressure measuring hole to be in communication with the total pressure output port.

19. The electrical connector according to claim 18, wherein the static pressure acquisition portion further comprises a static pressure output port and a static pressure transmission channel, the static pressure output port is provided in one of the main body portion and the connection portion, and the static pressure transmission channel is provided in the main body portion and/or the connection portion to allow the static pressure measuring hole to be in communication with the static pressure output port.

20. The electrical connector according to claim 19, wherein the static pressure output port is provided in a surface of the connection portion.

21. The electrical connector according to claim 19, further comprising a back pressure acquisition portion, wherein the back pressure acquisition portion comprises a back pressure measuring hole provided in a third part, away from the flow direction of the fluid, of main body portion.

22. The electrical connector according to claim 21, wherein the main body portion comprises a downstream side away from the flow direction of the fluid, and the third part is located on the downstream side.

23. The electrical connector according to claim 21, wherein the back pressure acquisition portion further comprises a back pressure output port and a back pressure transmission channel, the back pressure output port is provided in one of the main body portion and the connection portion, and the back pressure transmission channel is provided in the main body portion and/or the connection portion to allow the back pressure measuring hole to be in communication with the back pressure output port.

24. The electrical connector according to claim 21, wherein a helical protrusion is provided on an outer surface of the main body portion.

25. The electrical connector according to claim 24, wherein the helical protrusion is integrally formed by a coating coated on the outer surface of the main body portion, or the helical protrusion is a helical wire wound around the outer surface of the main body portion.

26. The electrical connector according to claim 24, wherein the helical protrusion is away from a region where at least one of the total pressure measuring hole, the static pressure measuring hole and the back pressure measuring hole is located.

27. A fluid state test device, comprising:
an electrical connector comprising:
a main body portion;
connection portions allowing the main body portion to be electrically connected to a charged element provided in a flow channel;
a total pressure acquisition portion, wherein the total pressure acquisition portion comprises a total pressure measuring hole, and the total pressure measuring hole is provided in a first part, facing a flow direction of fluid, of the main body portion; and
a static pressure acquisition portion, wherein the static pressure acquisition portion comprises a static pressure measuring hole, and the static pressure measuring hole is provided in a second part, parallel to the flow direction of the fluid, of the main body portion; and
a first pressure measurement portion connected to the total pressure measuring hole and the static pressure measuring hole respectively for measuring a pressure state of the fluid.

28. The fluid state test device according to claim 27, further comprising:

a flow speed calculation unit, wherein the flow speed calculation unit is configured to calculate a flow speed of the fluid located upstream of the electrical connector based on a dynamic pressure of the fluid at the total pressure measuring hole obtained through the first pressure measurement portion.

29. The fluid state test device according to claim 27, wherein the electrical connector further comprises: a back pressure acquisition portion;
the back pressure acquisition portion comprises a back pressure measuring hole, and the back pressure measuring hole is provided in a third part, away from the flow direction of the fluid, of main body portion; and
the fluid state test device further comprises a second pressure measurement portion, wherein the second pressure measurement portion is connected to the total pressure measuring hole and the back pressure measuring hole respectively to measure a pressure state of the fluid.

30. The fluid state test device according to claim 27, wherein: the main body portion comprises an upstream side, a first side and a second side, the upstream side faces the flow direction of the fluid, the first side and the second side are parallel to the flow direction of the fluid, the first part is located on the upstream side, and the second part is located on at least one of the first side and the second side, and wherein the fluid state test device further comprises:
a first temperature sensing element,
a second temperature sensing element, wherein the first temperature sensing element and the second temperature sensing element are respectively provided at mutually opposite positions on the first side and the second side in an electrically insulated manner; and
a frequency calculation unit which is configured to calculate a frequency of an alternating force applied by the fluid on the electrical connector in a direction perpendicular to the flow direction of the fluid, based on an alternating change of a measurement value of each of the first temperature sensing element and the second temperature sensing element.

31. The fluid state test device according to claim 30, wherein the frequency calculation unit comprises a first bridge resistor, a second bridge resistor, a direct-current power source and a calculation circuit;
the first temperature sensing element, the first bridge resistor, the second bridge resistor and the second temperature sensing element are electrically connected in order to form a return circuit;
a node between the first temperature sensing element and the second temperature sensing element and a node between the first bridge resistor and the second bridge resistor are respectively connected to two electrodes of the direct-current power source; and
the calculation circuit is configured to calculate the frequency of the alternating force based on an alternating change of an output voltage between a node between the first temperature sensing element and the first bridge resistor and a node between the second temperature sensing element and the second bridge resistor.

* * * * *